June 16, 1942.  W. L. McGRATH  2,286,296
TEMPERATURE CONTROL SYSTEM
Filed Dec. 24, 1938  3 Sheets-Sheet 1

Inventor
William L. McGrath
By George H Fisher
Attorney

Patented June 16, 1942

2,286,296

UNITED STATES PATENT OFFICE 2,286,296

TEMPERATURE CONTROL SYSTEM

William L. McGrath, St. Paul, Minn., assignor to Minneapolis-Honeywell Regulator Company, Minneapolis, Minn., a corporation of Delaware Application December 24, 1938, Serial No. 247,565

16 Claims. (Cl. 236—68)

This invention relates primarily to temperature control, being directed more particularly to an improved means for determining the load upon temperature changing equipment and for varying the temperature changing effect of the equipment in accordance with the load. While the following explanation and description for purposes of clearness will deal mainly with temperature control, my invention may be used in controlling other conditions or forces similarly.

More specifically, my invention deals with a device responsive to the ratio between the on time and off time of a thermostat which causes intermittent operation of temperature changing equipment for maintaining a given temperature. My present invention relates in some respects to my prior inventions disclosed in Patents Numbers 2,189,382 and 2,209,926. My present invention has somewhat different objects, however, and differs from the previous inventions and from the prior art in respects which will become apparent from the detailed disclosure herein.

An object of my invention is the provision of a temperature control system having improved means for more nearly balancing the supply of heat transporting medium with the load demands.

Another object is the provision in an intermittently operating temperature changing system of an improved device responsive to the aggregate duration of on cycles relative to the aggregate duration of off cycles of operation for varying the temperature changing rate.

Another object is the provision of a device responsive to the relationship between the duration of on cycles and off cycles of the thermostat, the device taking the form of a heat actuated switch so arranged that the switch will assume a substantially predetermined position depending upon the rate of heat input to the switch, the rate of heat input being determined by the relative amount of heating of the switch in terms of the time that the thermostat is indicating a need for operation of the temperature changing equipment.

Another object is the provision of improved means for automatically adjusting a temperature changing device in accordance with the load demands in an "on" and "off" temperature control system without the use of outdoor thermostats and without permitting the indoor temperature to deviate more than a slight increment from a predetermined value whereby more efficient cycling and improved control is obtained.

Another object is the provision of improved means for controlling temperature wherein the temperature changing effect of a temperature changing means is intermittently increased and decreased and the temperature changing effect is automatically varied in accordance with the relationship between the time that the temperature changing means is operating at an increased rate and the time that it is operating at a decreased rate.

Another object is the provision of a device for measuring the load on intermittently operated temperature changing equipment which will take a substantially predetermined position in response to the relationship between the time the equipment has been operating and the time it has not been operating.

Another object is the provision of a valve controlled by a heat actuated device which is heated when a controlling thermostat is on and is not heated when the thermostat is off, the device assuming a position proportional to the relation between aggregate on and off time of the thermostat.

Another object is the provision of a stage heating system having a device operable to control at least one stage of heating depending on the ratio of "on" time to "off" time of operation during a given increment of time.

Another object is the provision of a thermostatically controlled heating system having a device in the form of a heat actuated switch which cools when the thermostat is satisfied and heats when the thermostat is calling for heat and which may operate to vary heating depending upon the relative heating and cooling of the switch as time goes on.

Another object is the provision in a stage heating system of a heat actuated switch having substantial thermal mass, heating of the switch being controlled primarily by a thermostat and the heating means having different characteristics when the switch is closed, the switch controlling at least one stage of heating.

The exact nature of my invention and its manifold advantages will become apparent from the accompanying detailed description and drawings of representative embodiments thereof, it being understood that my disclosure of temperature control systems is illustrative of other arrangements in which the principles of my invention may be employed.

Figure 1:
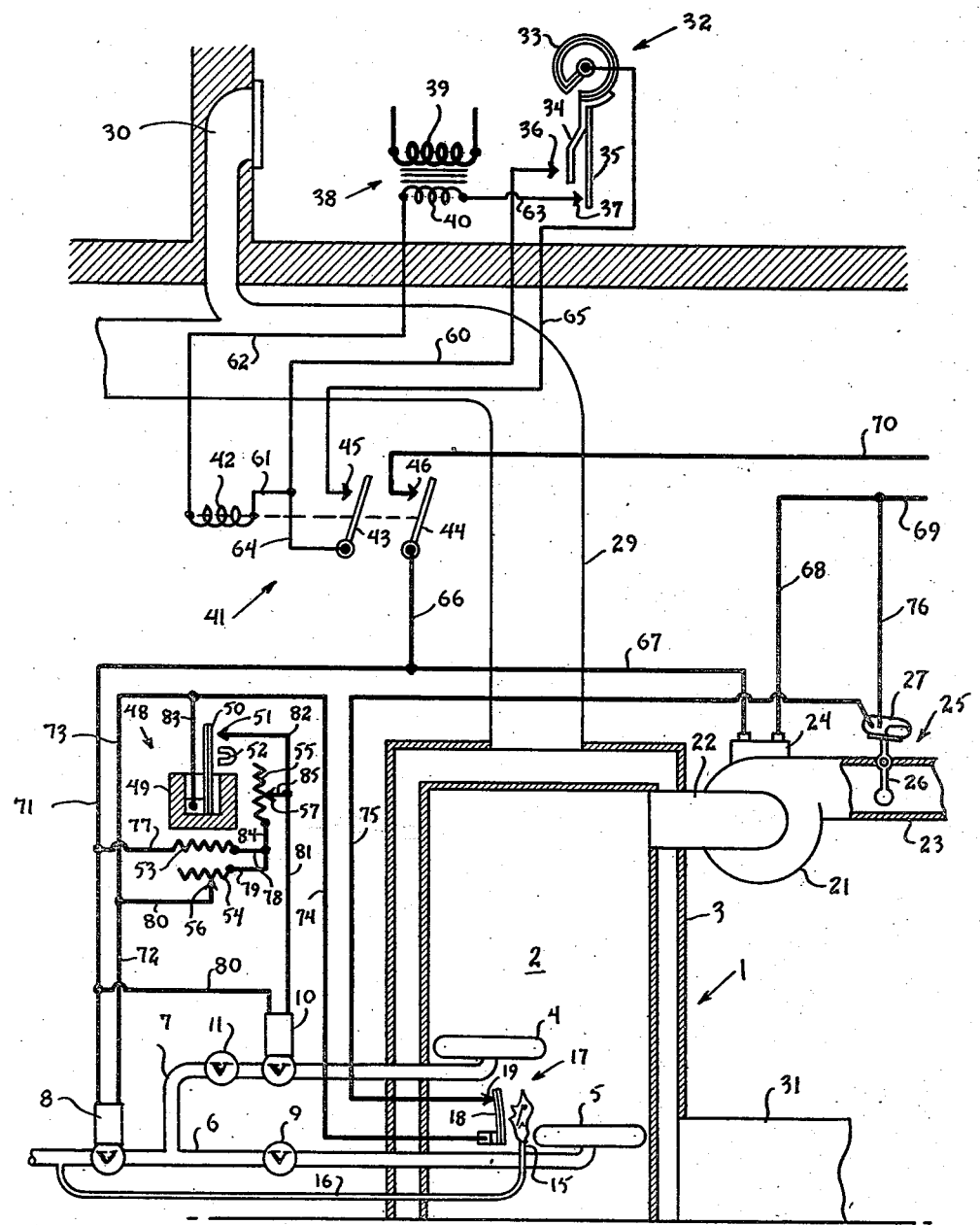
Figure 1 is a diagrammatic showing of a gas fired two-stage heating system employing my invention wherein two burners are provided.

Referring to Figure 1 of the drawings, numeral 1 designates generally a warm air furnace having a combustion chamber 2 which is enclosed by a jacket 3, the upper part of which forms a bonnet for the furnace. Disposed within the combustion chamber 2 are gas burners 4 and 5 which may be of a conventional type, the burner 5 being supplied with fuel through a conduit 6 which may connect to a gas supply main. The burner 4 is supplied with fuel through a branch conduit 7 connected to the conduit 6. Interposed in the conduit 6 ahead of the branch connection 7 is an electric control valve 8 and in the conduit 6 beyond the branch connection 7 is a hand valve 9. Interposed in the branch conduit 7 is an electric fuel control valve 10 similar to the valve 8 and ahead of this valve in the conduit 7 is a hand valve 11 corresponding to the valve 9. Arranged adjacent the lower burner 5 is a small pilot burner 15 which is continuously supplied with fuel through a tube 16 communicating with the conduit 6 ahead of the valve 8. Numeral 17 designates a safety pilot which may be of conventional type comprising a bimetal element 18 adjacent the flame of the pilot burner and which is normally flexed into engagement with a fixed electrical contact 19 when the pilot burner is burning.

An exhaust fan 21 which takes suction from the interior of the combustion chamber through a suction duct 22 is provided for producing a forced circulation of draft through the combustion chamber. Fan 21 discharges through a duct 23 and is driven by an electric motor having a terminal box indicated at 24. In the discharge duct 23 of the fan 21 is the operating element of a sail switch 25, the purpose of which will be presently described. The switch 25 comprises a pivoted lever element 26, the lower end of which is weighted and which is movable in response to the exhaust through the duct 23 and the upper end of which carries a mercury switch 27. Whenever the exhaust fan 21 is operating, the lever element 26 is moved in a counter-clockwise direction about its pivot causing closure of the mercury switch 27.

An air distributing duct 29 connects to the furnace bonnet and serves to distribute warm air to various spaces in a building which is to be heated, the duct 29 having branch ducts such as the one shown at 30 to deliver air to individual rooms. Air from all the spaces being heated may be returned to the furnace through a common return duct 31 communicating with the lower part of the furnace jacket.

My system is automatically controlled and it is primarily under the control of a space thermostat 32 which may be of a known type comprising a bimetal element 33 operable to move a pair of resilient switch blades 34 and 35, the blade 34 cooperating with a fixed electrical contact 36 and the blade 35 cooperating with a fixed electrical contact 37. Low voltage power is supplied from a transformer of the voltage step-down type indicated at 38 and comprising a primary winding 39 and a secondary winding 40, the primary winding having a greater number of turns than the secondary winding. Numeral 41 indicates a relay comprising a relay winding 42 arranged to actuate a pair of switch blades 43 and 44 cooperating with fixed electrical contacts 45 and 46, the said contacts being engaged by their respective switch blades when the relay is energized.

As will become apparent from the description of operation following, the burner 4 provides for a second stage of heating and is controlled by a switch device 48. The device 48 comprises a metal block 49 having substantial thermal mass within which is positioned a bimetal element 50 which cooperates with a fixed electrical contact 51. A permanent magnet 52 is provided for imparting snap opening and closing movements to the switch formed by the element 50 and contact 51. An electrical heating resistance 53 is arranged adjacent the block 49 and an electrical circuit through the heating resistance may be formed through either of two variable resistances 54 and 55 or through both of them, that is, parallel circuits may be formed through the variable resistances both extending through the heating resistance 53. The variable resistances 54 and 55 includes manually slidable contacts 56 and 57, respectively.

With the parts of the apparatus in the position shown on the drawing, the thermostat is satisfied and the heating equipment is not in operation. The thermostat 32 is of the type such that the blade 35 engages its associated contact at a predetermined temperature and the blade 34 engages its associated contact at a predetermined temperature which may be one or two degrees lower. Assuming that blade 35 is adjusted to engage its associated contact at 70° and blade 34 is arranged to engage its associated contact at 68° and that the temperature has fallen to 68°, both blades will be in engagement with their associated contact and an electrical circuit for energizing coil 42 will be completed as follows: from fixed contact 36 through a wire 60, wire 61, coil 42, wire 62, secondary winding 40 of transformer 38, wire 63, fixed contact 37, and blades 35 and 34 of thermostat 32. Immediately upon completion of this circuit, coil 42 will be energized and switch blades 43 and 44 will be moved into engagement with their associated contacts. As soon as switch 43 closes a maintaining circuit for coil 42 will be completed as follows: from fixed contact 37 of thermostat 32, through wire 63, secondary winding 40, wire 62, coil 42, wire 61, wire 64, switch blade 43, fixed contact 45, wire 65, and through the thermostat 32 back to fixed contact 37. It will be seen that this circuit is independent of thermostat blade 34 and fixed contact 36 so that once the coil 42 has become energized it will remain energized through the maintaining circuit until the temperature has again risen above 70°, the temperature at which blade 35 engaged fixed contact 37. Thus the thermostat has a definite operating differential and chattering of the relay due to vibration of the thermostatic contacts is eliminated.

Also upon energization of relay coil 42 and closure of switch 44, a circuit energizing the motor driving fan 21 is completed as follows: from a line conductor 70 to contact 46, switch blade 44, wire 66, wire 67, motor terminal box 24, and wire 68 connecting to line conductor 69, the line conductors 69 and 70 being connected to a source of external power, not shown. Operation of the fan 21 will scavenge the interior of the combustion chamber and as soon as draft has been established through the discharge duct 23, the mercury switch 27 will be moved to closed position and a circuit for energizing and opening the valve 8 will be completed as follows: from line conductor 70, fixed contact 46, switch blade 44, wire 66, wire 71, valve 8, wire 72, wire 73, wire 74, safety pilot 17, wire 75, mercury switch 27, wire 76 back to line conductor 69. It will be seen that the circuit just described cannot be completed unless the mercury switch 27 has closed assuring that draft has been established and that the combustion chamber has been properly scavenged. Heating will now commence under control of the thermostat 32 primarily and will continue as long as the thermostat is calling for heat. At the same time that the circuit for opening valve 8 is completed and heating started, a circuit for energizing the electrical heating resistance 53 is completed as follows: from line conductor 70 to fixed contact 46, switch blade 44, wire 66, wire 71, wire 77, resistance 53, wire 78, wire 79, a part of resistance 54, contact 56, wire 80 and wire 73, wire 74, safety pilot 17, wire 75, mercury switch 27 back to line conductor 69. Heat from resistance 53 will tend to heat the metal block 49 as long as thermostat 32 is calling for heat. Whenever the thermostat 32 becomes satisfied, it will cause deenergization of the above described circuits so as to terminate heating. When thermostat 32 again calls for heat the above described circuits will again be completed and heating will again commence in the manner described. Heater 53 will again be energized and heat will again be applied to the metal block 49. In this manner as the thermostat 32 cycles on and off, the device 48 will be heated at intervals, heat being dissipated between times when the device is not being heated. The thermal switch is arranged to have such mass that its response to a single heating cycle is unsubstantial but its position will correspond to a rate of heat input to the device determined by the aggregate amount of time that the thermostat has been demanding heat over a substantial period of time. The rate of heat input to the device 48 determined by the aggregate amount of time that the thermostat is calling for heat will be equivalent to a steady sustained rate of heat input at which the device 48 would accumulate heat until a certain temperature were reached at which the dissipation of heat from the device would be such that the temperature would level off and remain at a certain value. Element 50 would, of course, assume a position corresponding to this temperature value. It will be seen therefore that for a fixed heating load and a corresponding fixed rate of heat input to the device 48, the element 50 will not continuously progress in one direction or the other but assume a substantial predetermined position corresponding to the heating load. As the heating load on the building increases, the duration of on cycles relative to off cycles of the thermostat 32 will increase and the rate of heat input to block 49 will correspondingly increase, element 50 assuming a position closer to the contact 51. As will now be obvious when the heating load has increased to a certain value, the aggregate duration of on cycles with respect to off cycles will have increased sufficiently to cause the element 50 to move into engagement with the contact 51. When this occurs, an electric circuit will be completed for energizing the valve 10 as follows: from line conductor 70 through fixed contact 46, switch blade 44, wire 66, wire 71, wire 88, valve 10, wire 81, wire 82, fixed contact 51, element 50, wire 83, wire 74, safety pilot 17, wire 75, mercury switch 27 back to line conductor 69. Upon completion of this circuit the valve 10 is opened and fuel is supplied to the burner 4 whereby a second stage of heating commences. Increasing of the heating capacity of the furnace in this manner in accordance with the load will enable the apparatus to more readily heat the building and maintain the temperature at the desired value.

From the foregoing, it should be understood that the device 48 in bringing on the second stage of heating has measured the heating load very accurately inasmuch as the device unlike an outdoor thermostat, takes into consideration all factors which contribute to the heating load.

After a sustained increased load has once brought on the second stage of heating the increased heating rate will tend to shorten the on cycles of the thermostat. This would cause the system to return to first stage operation unless compensated for. Therefore I provide an arrangement for varying the characteristics of the heating element 53 so that once the second stage comes on it will stay on in the absence of a load decrease so as to thereby even out the operation and prevent the system from crossing back and forth from first stage to second stage operation as the thermostat 32 cycles. Thus when the element 50 engages contact 51, an additional parallel circuit including element 53 is completed as follows: from line conductor 70 through fixed contact 46, switch blade 44, wire 66, wire 71, wire 77, heater 53, wire 78, wire 84, a portion of resistance 55, contact 57, wire 85, wire 82, contact 51, element 50, wire 83, wire 74, safety pilot 17, wire 75, mercury switch 27, wire 76 back to line conductor 69. Because of this additional parallel circuit through the heater 53 the amount of current passing therethrough will be increased and the amount of heating will correspondingly be increased. The additional heating will tend to more firmly flex the element 50 into engagement with the contact 51. The increased heating at element 53 will compensate for the shorter on cycles of the thermostat so that the rate of heat input to the device 48 is not decreased when the system goes on second stage operation. Upon subsequent cycles of the thermostat both stages of the heating system will be brought on simultaneously and this second stage operation will continue as the thermostat 32 cycles until there is an appreciable drop in the heating load causing the duration of the on cycles to become shorter with respect to the off cycles to such an extent that there will be sufficient cooling of the block 49 drawing off cycles to cause the element 50 to flex away from the contact 51.

From the foregoing the manner of operation of my system embodying the particular device which I have described should be clearly understood by those skilled in the art. The unusual principle upon which it operates offers new advantages in the field of temperature control whereby more desirable and satisfactory results can be secured with extremely simple and inexpensive apparatus. Devices heretofore employed for sensing the heating load for purposes of determining what amount of heating is necessary have been responsive to temperatures and such devices are always subject to numerous error producing factors such as variation in the rate of heat leakage of a building, the number of doors and windows open, etc. My invention obviates the necessity of two-stage thermostats and the like and is more efficient than known types of devices of a similar nature inasmuch as the indoor temperature need not deviate from a predetermined value for bringing on a second stage operation.

In the past bonnet temperature responsive devices have been used to initiate second stage operation but such devices were not satisfactory due to the variability and consequent unreliability of bonnet temperatures. The device 48 itself forms a small furnace which is heated whenever the main furnace is heated. The device 48 however, has appropriate characteristics with respect to the main furnace whereby its temperature can be accurately relied on for bringing about second stage operation.

Figure 2:
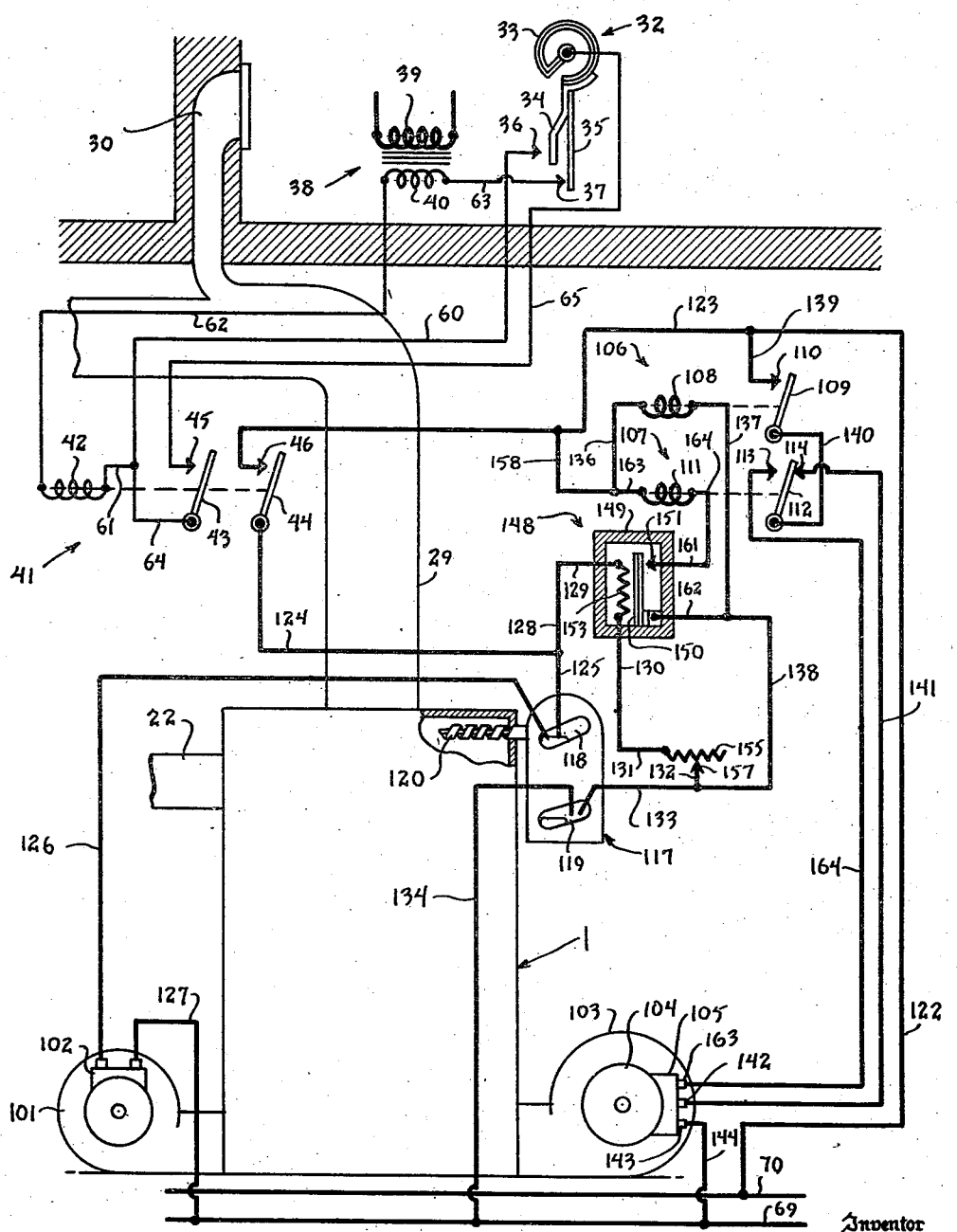
Figure 2 is a diagrammatic showing of a heating system embodying my invention wherein two stages of warm air circulation are provided.

In Figure 2 I have shown a second modification of my invention wherein I have applied the invention to the control of a multi-speed furnace fan rather than to the control of a plurality of burners. Those elements of Figure 2 which are identical with corresponding elements of Figure 1 are numbered the same and other elements are numbered with numbers greater than 100. The furnace 1 of Figure 2 is similar to that of Figure 1 but fuel is supplied by means of a motor driven fuel burner 101, the motor of which has a terminal box 102. In the system of Figure 2, air is forcibly circulated to the spaces being heated by means of a furnace fan 103 which draws air from the spaces being heated and forces it through the furnace jacket where it is heated and thence through the distributing conduit 29 to the spaces. The fan 103 is driven by a two-speed motor 104 which may be of a conventional type having a terminal box 105 into which electrical conductors lead for connection to the various windings. The speed changing mechanism for the multi-speed fan includes a relay 106 and a relay 107. The relay 106 comprises a coil winding 108 arranged to actuate a switch blade 109 cooperating with a fixed electrical contact 110 the switch being closed when the relay is energized. The relay 107 comprises a coil winding 111 arranged to actuate a switch blade 112 which cooperates with fixed electrical contacts 113 and 114, blade 112 engaging contact 114 when coil 111 is deenergized and contact 113 when coil 111 is energized.

Responsive to the temperature within the furnace bonnet is a switching device generally indicated at 117, this device comprising two mercury switches 118 and 119 both of which are arranged to be actuated by a helical bimetal thermostatic element 120 disposed within the furnace bonnet. Upon the air in the bonnet being heated to a predetermined temperature, the switch 119 will be moved to a closed position. The switch 118 is normally closed and is only open upon the occurrence of a predetermined high temperature in the bonnet, this switch being a high limit switch as will presently become apparent.

The device in Figure 2 which controls the second stage operation of the system is very similar to that of Figure 1 but is slightly modified in that instead of using a metal block having substantial thermal mass the bimetal switch is enclosed within an insulating housing in order to retard the dissipation of heat from the heating element. Referring to the device 148, it comprises a flexible bimetal switch blade 150 cooperating with fixed electrical contact 151, and the electrical heating resistance 153. The elements just mentioned are enclosed within an insulating housing 149. Numeral 155 designates a resistance element having a movable contact 157 slidable with respect thereto for varying the amount of resistance in circuit with the contact. As in the previously described embodiment of the invention, an electrical circuit may be formed through the heating resistance 153 and the resistance 155. Only one variable resistance is used in the present modification for reasons which will presently be seen.

In the present embodiment of the invention, the thermostat 32 controls the relay 41 in exactly the same manner as described in the previous embodiment and therefore this description of operation need not be repeated. Whenever relay 41 is energized, switch blade 44 engages contact 46 completing a circuit for energizing the fuel burner motor as follows: from line conductor 70 to a wire 122, wire 123, contact 46, switch blade 44, wire 124, wire 125, mercury switch 118, wire 126, motor terminal box 102, and wire 127 back to line conductor 69. As soon as the circuit just described is completed, the fuel burner 101 is started in operation for supplying fuel to the combustion chamber to begin heating, it being understood that the system includes conventional mechanism for igniting the fuel upon its being supplied to the combustion chamber.

After heating has been initiated and has continued for a time long enough for the bonnet temperature to rise sufficiently to cause closure of mercury switch 119, closure of which will occur at a temperature suitably high for heating purposes, circuits will be completed for energizing the electrical heater 153 and for energizing the relay 106. The heater circuit is as follows: from line conductor 70 through wire 122, wire 123, contact 46, blade 44, wire 124, wire 128, wire 129, heater 153, wire 130, wire 131, part of resistance 155, contact 157, wire 132, wire 133, mercury switch 119, wire 134 back to line conductor 69. As soon as this circuit just described is completed, heater element 153 will begin to supply heat to the device 148. The circuit for energizing relay 106 is as follows: from line conductor 70 through wire 122, wire 123, wire 158, wire 136, winding 108, wire 137, wire 138, wire 133, mercury switch 119, and wire 134 back to line conductor 69. As soon as the circuit just described is completed energizing relay 106, switch blade 109 will be moved into engagement with contact 110 completing a circuit for energizing the motor 104 for operating the fan 103 at its first stage speed, it being understood that the switch blade 112 remains at present in contact with contact 114. The circuit now completed for the fan motor is as follows: from line conductor 70, through wire 122, wire 139, contact 110, switch blade 109, wire 140, switch blade 112, contact 114, wire 141, a terminal 142 of terminal box 105 through the appropriate motor windings, terminal 143 and wire 144 back to line conductor 69. Warm air will now be forcibly circulated to the spaces being heated, the fan operating as stated at a relatively low first stage speed. Heating will progress in the manner described until the temperature in the space being heated rises high enough to satisfy the thermostat 32 causing it to open the circuits which it controls deenergizing the relay 41 and heater 153. Deenergization of the relay 41 will bring about interruption of the burner motor circuit so as to discontinue burner operation. Operation of the fan will continue until switch 119 opens.

From the foregoing, it will be apparent that heat was supplied by the element 153 substantially during the time that heating was in progress. During the time that the thermostat is satisfied, the device 148 will cool as in the previous embodiment.

The manner of operation of the device 148 is substantially the same as described in the previous modification except that in the present embodiment instead of the device comprising a metal block having substantial thermal mass the heat retaining housing 149 encloses the switch and the heater element so as to retard the dissipation of heat therefrom to the surrounding atmosphere. The thermostat 32 will now cycle on and off, the on and off intervals depending upon the magnitude of the heating load. As in the previous embodiment, the relative duration of on and off cycles will produce relative heating and cooling of the device 148 which will amount to a heat input rate to the device equivalent to a certain steady continuous heat input to the device at which the element 150 will assume a predetermined net position, that is, depending upon the rate of heat input to the device 148 its temperature will eventually level off at a certain value at which continued heat input at the same rate will no longer cause the temperature to continue rising. The element 150 is designed to have sufficient mass so that its movement in one direction or the other upon heating or cooling during a single cycle is very small but that after a number of cycles depending upon their relative duration, and therefore upon the equivalent rate of heat input to the device 148, the element 150 will assume a certain net position at a distance from the contact 151 corresponding to the rate of heat input. When the heating load has increased until the ratio of the duration of on cycles to off cycles has reached a predetermined amount, element 150 will make contact with 151 bringing on the second stage of fan operation in a manner similar to that described in the previous embodiment. In all probability this will occur during an on cycle of the thermostat when heating is in progress and when element 150 does engage contact 151 a circuit energizing the relay 107 is completed. The circuit referred to above for energizing the relay 107 is as follows: from line conductor 70 through wire 122, wire 123, wire 158, wire 163, winding 111, wire 164, wire 161, contact 151, element 150, wire 162, wire 138, wire 133, mercury switch 119, and wire 134 back to line conductor 69. Upon completion of this circuit energizing relay 107, blade 112 is moved out of engagement with contact 114 and into engagement with contact 113. Upon engagement of blade 112 with contact 113, a circuit is completed for energizing the appropriate windings of motor 104 for operating the motor at its second stage or relatively high speed. This circuit is as follows: from line conductor 70 through wire 122, wire 139, contact 110, blade 109, wire 140, blade 112, contact 113, wire 164, terminal 163 of terminal box 105, through the appropriate windings of motor 104, terminal 143 and wire 144 back to line conductor 69. The fan 103 will now be operated at a relatively high speed forcibly circulating heated air to the spaces being heated at a greater rate. It will be seen therefore that when the heating load has increased to a certain amount as measured by the device 148, the rate of supply of heated air is increased. Increased fan speed will not cause a greater amount of heat to be carried to the spaces but will carry heat away from the furnace at a faster rate so that the bonnet temperature and the temperature of the circulating air will be lower. This will not tend to shorten the thermostatic cycles so the additional circuit for element 153 is not necessary. While the heating load remains substantially the same now or increases the thermostat will cycle on and off, the system operating at its second or increased stage air supply rate during each on cycle of the thermostat, the element 150 remaining in engagement with the contact 151.

From the foregoing, it should be apparent that the embodiment of Figure 2 of the invention has all the advantages and utilities enumerated above in connection with the embodiment of Figure 1. It is to be appreciated that the apparatus for bringing about second stage operation is of a very reliable nature, yet embodying the utmost simplicity. By merely manipulating the variable electrical resistance which I have provided, the system may be adjusted to operate at second stage capacity at any desired heating load. Obviously, the device 148 and its adjustment means can be used with any thermostatically or correspondingly controlled apparatus inasmuch as the function of the device 148 is not in any way dependent upon the size of the objective being treated or its particular characteristics.

Figure 3:
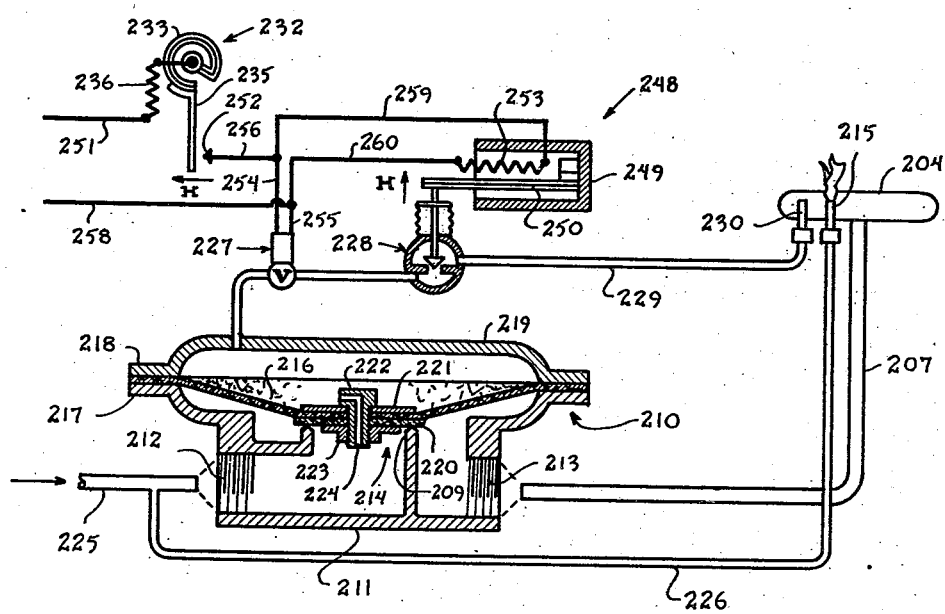
Figure 3 represents another form of my invention.

Referring to the modification of Figure 3 of the drawings I have shown a somewhat different adaptation of my invention wherein the heating capacity of the system is gradually changed in accordance with the load. In Figure 3 numeral 210 designates a known type of diaphragm gas control valve comprising a valve body 211 having an inlet 212 and an outlet 213. Passage of gas through the valve is controlled by a valve member 214 movable by a flexible diaphragm 216 and cooperable with a seat 209. The edges of the diaphragm 216 are sealed between a peripheral flange 217 formed integrally with the valve body and a flange 218 forming part of a cover member 219. The valve member 214 comprises a seat disc 220 made of flexible material. The seat disc 220 is disposed adjacent the diaphragm 216 and on the opposite side of the diaphragm is a metal backing disc 221, the elements of the valve member being retained in their respective relation by a bolt 222 and a disc nut 223. An aperture 224 extends through the bolt 222 providing communication from the inlet side of the valve to the chamber above the diaphragm. The manner of operation of the valve 210 is well known in the art, the valve being closed whenever there is pressure above the diaphragm and the valve being opened when the pressure above the diaphragm is released.

Fuel is supplied to the valve from a conduit 225 and the outlet of the valve is connected to a burner 204 by a conduit 207. Adjacent the burner 204 is a pilot burner 215 which is continuously supplied with gas through a tube 226 communicating with the conduit 225.

The pressure above the diaphragm 216 is controlled by an electric valve 227 and a throttling valve 228, the two valves being in series in a tube 229 which conveys gas from the chamber above the diaphragm to an auxiliary pilot burner 230 whenever both valves are open. The modulating valve 228 may be of a conventional type having a valve member which is automatically positioned by element 250. The element 250 corresponding to the element 50 of Figure 1, and the device 248 as a whole being similar to the device 48 of Figure 1. The valve 227 and the device 248 are controlled by a thermostat 232 comprising a bimetal element 233 and a movable switch blade 235. Adjacent the thermostat 232 is a heating element 236 which is energized when the thermostat is closed so as to produce a small amount of heat adjacent the thermostat.

In operation the valve 210 is opened and closed in response to opening and closing of thermostat 232 and corresponding opening and closing of valve 227, the valve 228 always being in a partly open position. Whenever the thermostat 232 closes indicating a need for heating a circuit is established for opening valve 227 as follows: from wire 251 through heater 236, thermostat 232, fixed contact 252, wire 256, wire 254, valve 227 back to wire 258. The wires 251 and 258 may be connected to any suitable source of power. Whenever valve 227 is opened pressure will be released from above diaphragm 216 and will be bled off at a rate determined by the position of valve 228. Heater 253 of the device 248 is energized whenever the thermostat is calling for heat through the following circuit: from wire 251 through heater 236, thermostat 232, contact 252, wire 256, wire 259, heater 253, wire 260 back to wire 258. The position of valve 228 will of course be determined by the device 248 and the position of element 250 of device 248 will be determined by the relationship between the duration of on and off cycles of the thermostat as described in connection with previous embodiments. When thermostatic cycles are longer element 250 will position valve 228 to a wider open position so as to supply gas at a greater rate. It will be seen therefore that at increased heating loads the heating capacity of the system will be greater and less time will be required upon each demand for heat for the system to bring the temperature back up to the required value. In ordinary on and off temperature controlled systems the capacity of the system is ordinarily fixed. When a heavy load is imposed on a system the temperature may depart appreciably from the desired value and it will take a long period of operation for it to be brought back to the desired value. In my system the capacity of the heating apparatus is increased proportionately to the load so that the temperature can be more readily efficient and quickly brought back to the desired value after it deviates therefrom. In the system of Figure 3 as the load increases the capacity of the system is also increased. As the load on the system increases the thermostatic cycles become longer but because of the increase in capacity of the system the thermostatic cycles do not increase in length as much as they would otherwise. The system of Figure 3 results in the advantage that indoor temperatures can be more uniformly maintained and when the temperature deviates from the desired value it is more quickly brought back to normal.

The heating element 236 provides for a function known in the art, that is, when the thermostat is calling for heat, heater 236 is energized and its heat tends to open the thermostat 232 sooner than it would otherwise open tending to anticipate the arrival of heat from the heating source which would be sufficient to open the thermostat.

Figure 4:
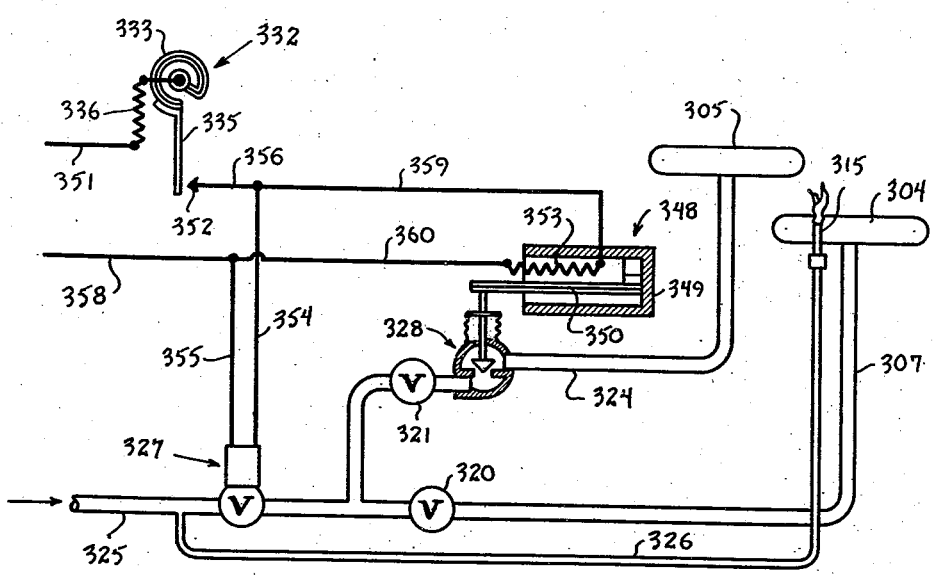
Figure 4 represents a further form of my invention.

The system of Figure 4 is similar to that of Figure 3 except that the thermostat and the device 348 are utilized to control main valves instead of pilot valves. In Figure 4 valve 327 is an electric valve in a main gas line 325 connected to a burner 304. The valve 328 corresponds to the throttling valve 223 and is interposed in a branch conduit 324 leading to a second burner 305. Hand valves 320 and 321 are interposed in the conduits 307 and 324, respectively. Whenever the thermostat 332 indicates a need for heat a circuit is completed for opening the valve 327 as follows: from wire 351 through heater 336, thermostat 332, contact 352, wire 356, wire 354, valve 327, wire 355 back to wire 358. Whenever the thermostat is calling for heat the element 353 is also energized through the following circuit: from wire 351 through heater 336, thermostat 332, contact 352, wire 356, wire 359, heater 353, wire 360, back to wire 358. Whenever the thermostat 332 is calling for heat a minimum amount of gas passes through the valve 320 depending upon its adjustment and an additional quantity of gas passes through the valve 328 depending upon its position as determined by the device 348. Thus the total amount of gas supplied whenever heat is demanded is adjusted correspondingly to the load. The system of Figure 4 has the same advantages and novel results as pointed out in connection with Figure 3.

The representative embodiments of the invention which have been disclosed are exemplary forms which it may take. The disclosed embodiments are illustrative and the invention is to be limited only in accordance with the scope of the appended claims.

I claim as my invention:

1. In a temperature control system, in combination, variable capacity temperature changing equipment, a thermostat responsive to a medium the temperature of which is modified by said temperature changing equipment, means whereby said thermostat may cause intermittent operation of said equipment, means for varying the capacity of said temperature changing equipment, said last mentioned means comprising a temperature responsive switch means independent of the thermostat and having substantial thermal mass, means for heating said switch means, said heating means being controlled in accordance with the operation and non-operation of the temperature changing equipment whereby the rate of heat input to the switch means and its resultant net temperature are determined by the ratio between the time of operation and the time of non-operation of the temperature changing equipment, and means controlled by said switch means operative to effect a change in the capacity of the temperature changing equipment when the temperature affecting the switch means reaches a predetermined value.

2. In a temperature control system, in combination, variable capacity temperature changing equipment, a thermostat responsive to a medium the temperature of which is modified by said temperature changing equipment, means whereby said thermostat may cause intermittent operation of said equipment, means for varying the capacity of said temperature changing equipment, said last mentioned means comprising a temperature responsive switch means independent of the thermostat and having substantial thermal mass, means for heating said switch means, means controlling operation of said heating means in accordance with the conditions of operation and non-operation of the temperature changing equipment to cause operation of the switch heating means during one of said conditions of the temperature changing equipment and to render said heating means inoperative during the other of said conditions, whereby the rate of heat input to the switch means and its resultant net temperature are determined by the ratio between the time of operation and the time of non-operation of the temperature changing equipment, and means responsive to said switch means operative to effect a change in the capacity of the temperature changing equipment when the temperature affecting the switch means reaches a predetermined value, and means for adjusting said heating means whereby the ratio between the time of operation and non-operation of said temperature changing equipment at which said switch means brings about a change in the capacity of the temperature changing equipment may be varied.

3. In a temperature control system, in combination, variable capacity temperature changing equipment, a thermostat responsive to a medium the temperature of which is modified by said temperature changing equipment, means whereby said thermostat may intermittently operate said equipment, control means responsive to the relationship between the aggregate duration of operation and the aggregate duration of inoperation of the temperature changing equipment, said last mentioned means being movable independent of the thermostat and assuming a predetermined average position depending on said relationship and means responsive to said control means operating to vary the capacity of the temperature changing equipment when said relationship between the aggregate duration of operation and the aggregate duration of inoperation of the temperature changing equipment assumes a predetermined ratio, and means for varying the relationship between aggregate duration of operation and inoperation of the temperature changing equipment at which a change in capacity thereof is brought about.

4. In a temperature control system in combination, heat exchange equipment, a space thermostat for controlling said equipment to maintain a given temperature, means for varying the heat exchange capacity of the equipment, said means comprising a heat actuated switch movable independent of the thermostat, an electric heater for the switch, said heater being controlled by the thermostat whereby the switch is heated when the thermostat is not satisfied, said switch accumulating sufficient heat to cause closure thereof depending upon the proportionate time of heating thereof, said switch effecting operation of said means for varying the heat exchange capacity of the heat exchange equipment upon closing and means controlled by the switch for additionally heating the switch and tending to keep it in closed position.

5. In a temperature control system in combination, heat exchange equipment, a space thermostat for controlling said equipment to maintain a given temperature, means for varying the heat exchange capacity of the equipment, said means comprising a heat actuated switch movable independent of the thermostat, an electric heater for the switch, said heater being controlled by the thermostat whereby the switch is heated when the thermostat is not satisfied, said switch accumulating sufficient heat to cause closure thereof depending upon the relative aggregate time of heating and aggregate time when it is not heated, said switch effecting operation of said means for varying the heat exchange capacity of the heat exchange equipment upon closing and means controlled by said switch for additionally heating the switch and tending to keep it in closed position, and means for adjusting the rate of heating of said heater.

6. In a temperature control system in combination, heat exchange equipment, a space thermostat for controlling said equipment to maintain a given temperature, means for varying the heat exchange capacity of the equipment, said means comprising a heat actuated switch movable independent of the thermostat, an electric heater for the switch, said heater being controlled by the thermostat whereby the switch is heated when the thermostat is not satisfied, said switch accumulating sufficient heat to cause closure thereof depending upon the relative aggregate duration of heating and cooling, said switch effecting operation of said means of varying the heat exchange capacity of the heat exchange equipment upon closing, means controlled by the switch for additionally heating the switch and tending to keep it in closed position, and variable resistance means for adjusting heating of the switch when the thermostat is not satisfied whereby the ratio of time of heating and cooling of the switch necessary for its closure can be adjusted.

7. In a system of temperature control, in combination, a temperature changer operable at a variable heat exchange rate, a thermostat controlling said temperature changer, means for varying the temperature changing effect of the temperature changer comprising a heat responsive switch independent of the thermostat and having substantial thermal mass, and means for heating the switch when the thermostat is not satisfied, said switch cooling when the thermostat is satisfied, said switch assuming a net temperature depending upon the ratio of heating to cooling of the switch as determined by the thermostat and means controlled by said switch operative to vary the heat exchange rate of the temperature changer.

8. In a temperature control system, in combination, temperature changing equipment for changing the temperature of a heat transporting medium, means for circulating heat transporting medium to a space, a thermostat controlling said equipment for maintaining a given temperature in the space, means comprising a thermal switch independent of the thermostat, said last mentioned means including a heater controlled by the thermostat for heating the switch when heat is being supplied to the space, said switch cooling when heat is not being supplied to the space, the rate of heat input to the switch depending on the ratio of time it is heated to the time it is not heated, said switch assuming a predetermined position depending on the rate of heat input thereto, said switch closing at a predetermined rate of heat input thereto, and means responsive to said switch for increasing the circulation of heat transporting medium to the space.

9. In a temperature control system, in combination, a temperature changing means, a thermostat controlling said means, a thermal switch independent of the thermostat and having substantial thermal mass, means for supplying heat to the switch when the thermostat is indicating a need for operation of the temperature changing means, said switch heating means being inoperative and the switch dissipating heat when the thermostat does not call for operation of the temperature changing means, said switch means being arranged so that dissipation of heat therefrom is retarded, said switch appreciably changing its position only in response to the average rate of heat input thereto determined by the relative duration of time when heat is being supplied thereto and when heat is not supplied thereto over a substantial period of time, and means responsive to said switch for varying the temperature changing effect of the temperature changing means.

10. In a temperature control system, in combination, a temperature changing means, a thermostat controlling said means, means for varying the temperature changing effect of said temperature changing means comprising a thermal switch independent of the thermostat and having substantial thermal mass, means for supplying heat to the switch when the thermostat is indicating a need for operation of the temperature changing means, said switch heating means being inoperative and the switch dissipating heat when the thermostat does not call for operation of the temperature changing means, said switch means being arranged so that dissipation of heat therefrom is retarded, said switch appreciably changing its position only in response to the average rate of heat input thereto determined by the relative duration of time when heat is being supplied thereto and when heat is not supplied thereto over a substantial period of time, and means controlled by said switch for additionally supplying heat thereto.

11. In apparatus of the character described, in combination, heating means for heating a medium, thermostatic means operative to turn the heating means on at a predetermined temperature and off at another predetermined temperature, said thermostatic means being responsive to the temperature of the medium so that the relative duration of the off periods and the on periods of the heating means depends upon the heating requirements, control means responsive to the relative duration of the alternate on and off periods comprising a heat responsive device capable of movement independent of said thermostatic means, means for heating the device, means for rendering said device heating means operative during the periods of one of the alternating series of on periods and off periods of the heating means, the device dissipating heat during the periods of the other said series, whereby the device assumes a position depending upon the rate of heat input thereto as determined by the relative lengths of the said on periods and off periods of the heating means, and means responsive to the position of said control means operative to adjust the rate of heating of said heat means.

12. In a temperature regulating system, temperature changing equipment variably operative at different heat exchange rates for changing the temperature of a fluid medium, a thermostat movable in response to variations in temperature of said medium to be regulated operative to initiate temperature changing operation of said equipment at one predetermined temperature and terminate said operation of said equipment at another predetermined temperature, an auxiliary control device capable of movement independent of the thermostat and measuring the operating demand on said equipment responsive to the thermostat, means for adjusting the auxiliary control device to different positions operative in dependency on the duration and frequency of the operative and inoperative periods of said equipment, and means for varying the heat exchange operating rate of said equipment operative in dependency on the position of the auxiliary control device.

13. In a temperature regulating system, temperature changing equipment variably operative at different heat exchange rates for changing the temperature of a fluid medium, a thermostat movable in response to variations in temperature of said medium to be regulated operative in an on position to initiate temperature changing operation of said equipment at one predetermined temperature and operative in an off position to terminate said operation of said equipment at another predetermined temperature, a heat responsive auxiliary control device capable of movement independent of the thermostat and measuring the operating demand on said equipment, heating means rendered operative by the thermostat in one of its on and off positions, and rendered inoperative when the thermostat is in the other of said positions, for intermittently heating and adjusting the auxiliary control device to different positions in accordance with the relative duration of the alternate operative and inoperative periods of the equipment, and means for varying the heat exchange operating rate of the equipment operative in dependency on the position of the auxiliary control device.

14. In a temperature regulating system, temperature changing equipment variably operative at different heat exchange rates for changing the temperature of a fluid medium, a thermostat movable in response to variations in temperature of said medium to be regulated operative to initiate temperature changing operation of said equipment at one predetermined temperature and terminate said operation of said equipment at another predetermined temperature, auxiliary control mechanism measuring the operating demand on the equipment including a heat responsive member free of direct connection with the thermostat adapted to move in one direction along a path upon heating and to move in the opposite direction along its path upon cooling, means operating to heat the member during each operating period of the equipment to advance the member along its path in one direction to an extent dependent on the duration of such periods, and means for rendering said heating means inoperative during each inoperative period of the equipment and causing the member to cool and advance along its path in the opposite direction to an extent dependent on the duration of such latter periods, and means for varying the heat exchange operating rate of the equipment operative in dependency on the position of said movable member of the auxiliary control mechanism.

15. In a temperature regulating system, an intermittently operative temperature changing equipment comprising a first unit and a second unit for changing the temperature of a fluid medium at a plurality of heat exchange rates, a thermostat movable in response to variations in temperature of said medium to be regulated operative to initiate temperature changing operation of one of said units at a predetermined temperature and terminate said operation of said unit at another predetermined temperature, an auxiliary control device capable of movement independent of the thermostat and measuring the operating demand on the equipment at the heat exchange rate produced by said one unit, means for adjusting the auxiliary control device to different positions operative in dependency on the duration and frequency of the operative and inoperative periods of said first equipment unit, and means operative in dependency on the position of the auxiliary control device controlling operation of the second equipment unit and effective to vary the heat exchange operating rate.

16. In a temperature regulating system, temperature changing equipment variably operative at different heat exchange rates for changing the temperature of a fluid medium, a thermostat movable in response to variations in temperature of said medium to be regulated operative to initiate operation of the equipment at one predetermined temperature and terminate said operation of said equipment at another predetermined temperature, the relative duration of the off and on periods of the thermostat and the temperature changing equipment depending on the demand upon the equipment, a heat responsive control device capable of movement independent of the thermostat and measuring the operating demand on the equipment, heating means rendered operative by the thermostat in one of its on and off positions, and rendered inoperative when the thermostat is in the other of said positions, for intermittently heating said heat responsive device and effective to produce gradual movement thereof to different positions in accordance with the relative duration of the alternate operative and inoperative periods of the equipment and means for gradually varying the heat exchange operating rate of the equipment operative in dependency on the position of the heat responsive control device.

WILLIAM L. McGRATH.